United States Patent

[11] 3,620,680

[72] Inventors: Gunter Friedrich Bartel;
Martin Klawitter; Ernst Denker, all c/o Die Kunststoffburo Osnabruck Dr. Reuter GmbH, 4531 Lotte, Hannover, Germany
[21] Appl. No.: 844,268
[22] Filed: July 24, 1969
[45] Patented: Nov. 16, 1971
[32] Priority: Mar. 10, 1969
[33] Germany
[31] P 17 70 990.9

[54] APPARATUS FOR CONTINUOUSLY MAKING THERMOPLASTIC POLYURETHANES
4 Claims, 1 Drawing Fig.

[52] U.S. Cl. .................................................. 23/260,
23/252, 260/75 NE, 260/77.5 AM
[51] Int. Cl. .................................................. B01j 1/00,
C08g 22/04
[50] Field of Search .................................................. 23/260,
252, 285, 288.3; 260/75 TN, 77.5 AM, 77.5 AX

[56] References Cited
UNITED STATES PATENTS

| | | | |
|---|---|---|---|
| 3,076,700 | 2/1963 | Renner ........................ | 23/260 X |
| 3,230,047 | 1/1966 | Weinbrenner et al. ....... | 23/252 |
| 3,312,666 | 4/1967 | Knipp et al. .................. | 260/75 NE |

Primary Examiner—Joseph Scovronek
Attorney—Clelle W. Upchurch

ABSTRACT: A process and an apparatus for making thermoplastic polyurethanes continuously, the apparatus combining a storage tank and dehydrating equipment for a polyol and storage tanks for other components of a polyurethane reaction mixture all connected through conduits to a mixing device which discharges the reaction mixture continuously over the surface of a conveyor belt. The conveyor belt is provided with means for controlling the temperature thereof. The solidified thermoplastic product discharged from the belt is continuously granulated and conveyed to containers.

PATENTED NOV 16 1971 3,620,680
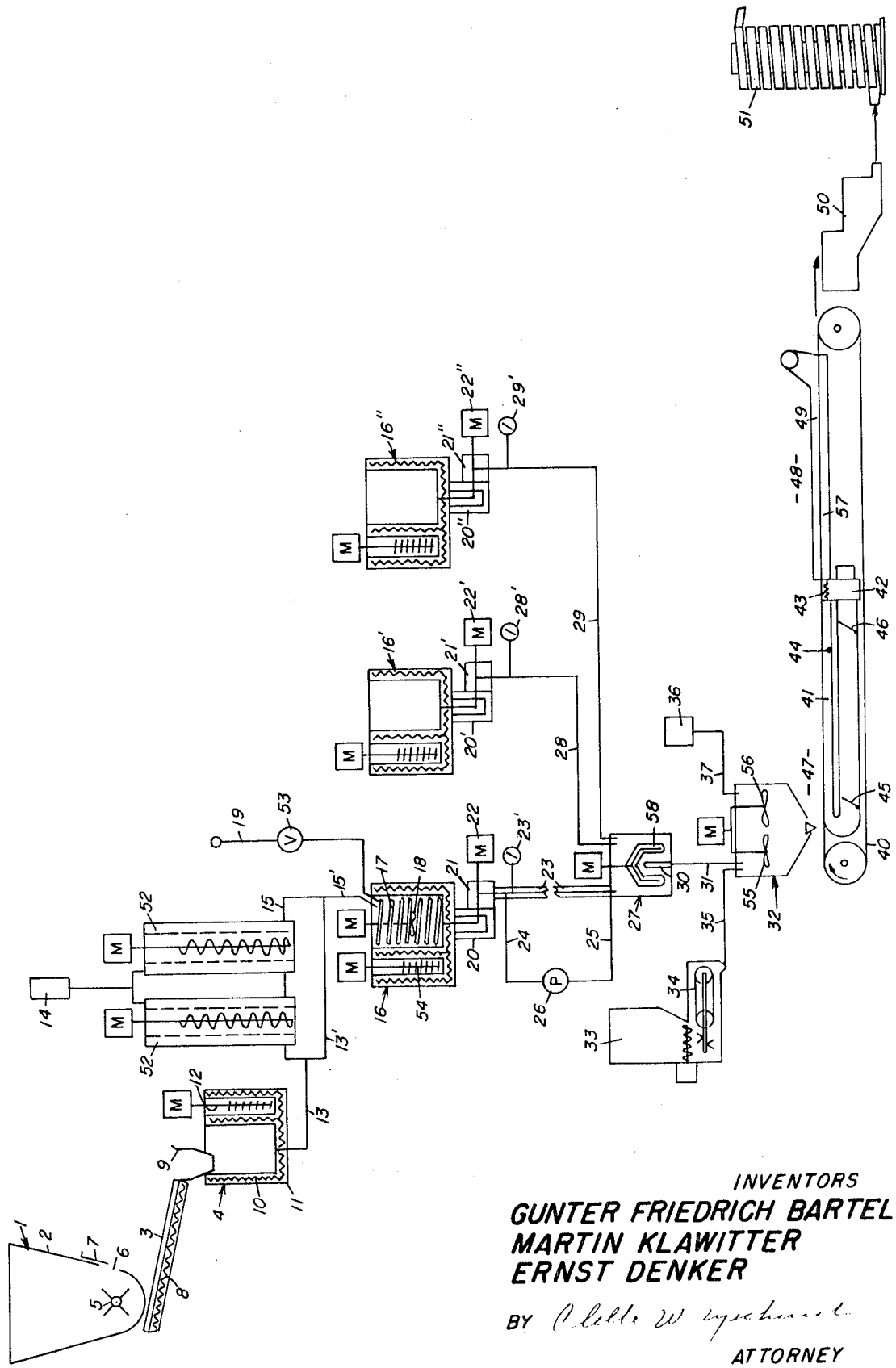
INVENTORS
GUNTER FRIEDRICH BARTEL
MARTIN KLAWITTER
ERNST DENKER
BY
ATTORNEY

APPARATUS FOR CONTINUOUSLY MAKING THERMOPLASTIC POLYURETHANES

This invention relates generally to polyurethanes and more particularly to a method and apparatus for continuously manufacturing a polyurethane adapted to be processed by thermoplastic shaping methods.

It has been proposed heretofore to manufacture a polyurethane adapted to be processed by thermoplastic shaping methods such as, for example, calendaring, compression molding, extrusion or the like. The process for making such polyurethanes involves mixing together components which react rapidly with each other and requires careful control of the reaction conditions with interruption of the chemical reaction before a polyurethane has been produced which is no longer processable by thermoplastic methods. Because the reaction has to be controlled very carefully and the components used in making the reaction mixture must be handled with care prior to mixing, the heretofore available processes have largely been batch-type processes. It is very difficult to produce a product having the same composition from one batch to another so the products heretofore available have varied in physical characteristics and processability. The net result has been a very complicated and involved process with accompanying high production costs.

It is an object of this invention to provide a method and apparatus for continuously making a thermoplastic polyurethane. Another object of the invention is to provide an apparatus adapted to dehydrate those components requiring it and to mix all of the components of a polyurethane reaction mixture together under conditions which produce a solid polyurethane adapted to be processed by thermoplastic shaping methods. A further object of the invention is to provide a method for making a solid thermoplastic polyurethane of substantially constant composition over an extended period of time.

Other objects will become apparent from the following description with reference to the accompanying drawing which illustrates diagrammatically one embodiment of the apparatus provided by this invention.

In accordance with this invention the foregoing objects and others are accomplished, generally speaking, by providing a plurality of storage tanks for the components of a polyurethane reaction mixture, means for continuously charging into a mixing head metered amounts of each component and means for continuously spreading the resulting reaction mixture over the surface of a conveyor belt provided with means for carefully controlling the temperature thereof. More specifically, the invention combines a means for storing, heating and dehydrating a polyol and for continuously charging this polyol into a mixing chamber with means for simultaneously charging an organic isocyanate and other components of a polyurethane reaction mixture continuously in metered quantities in the same mixing chamber and with a conveyor belt moving at a constant speed adjacent the discharge opening of the mixing chamber. The conveyor belt is adapted to receive from the mixing chamber the resulting reaction mixture while it is still liquid and will spread as a thin film over the conveyor. Means is provided at that end of the conveyor adjacent the mixing head to heat the reaction mixture spread thereon to provide a temperature which will encourage reaction of the liquid reaction mixture until a solid has been formed. Means is provided at the other end of the conveyor to cool the solid product to interrupt chemical reaction before the polyurethane is no longer processable by thermoplastic shaping methods. In one embodiment of the process provided by this invention, the polyol is heated to about 130° C., dehydrated at a temperature of at least about 120° C. and is then cooled to about 100° C. before it is metered into a premixing chamber where it is mixed with a chain extender or other component of the reaction mixture not reactive with the polyol. The premix of liquid components is then mixed with an organic diisocyanate and other components of a mixture which will form a thermoplastic polyurethane such as, for example, fillers, dyes and the like. The resulting mixture is then spread over the surface of a conveyor where the temperature thereof is maintained at chemical reactive levels until the mixture solidifies. Chemical reaction is interrupted after solidification by cooling the polyurethane while it is still processable by thermoplastic methods.

Referring now to the diagrammatic drawing for a description in detail of one embodiment of the invention, a bin or tank 1 for storage of polyol is provided with a slot shaped discharge opening 6 with slide closure 7 near the bottom of sidewall 2. A stirrer 5 extends longitudinally along the bottom of bin 1 adjacent slot 6. The volume of polyol discharged continuously from bin 1 depends upon the number of revolutions per minute of stirrer 5 and the size of slot 6 determined by slide 7. Polyol discharged through slot 6 falls upon a sloping trough 3 into trough shaped collector 9 and then into tank 4. Trough 3 is provided with a heating coil 8, either electric, hot water or steam heated to melt solid or heat liquid polyol. A jacket 11 heated with coil 10 maintains the temperature of the polyol within the desired range, usually at about 130° C. Propeller type stirrer 12 driven by motor M insures circulation of the heating medium in jacket 11. The angle of the incline of trough 3 and the temperature of the polyol in the trough affect the rate at which the polyol flows into tank 4.

The liquid polyol flows from the bottom of tank 4 through conduit 13. If the polyol is charged as a solid to bin 1 or if it is a liquid polyol containing water, the liquid polyol flows from conduit 13 into a vacuum dehydrating apparatus 14 where it is heated to remove water through condensers 52. The dehydrated polyol flows through conduit 15 into tank 16. If a substantially anhydrous liquid polyol is charged to bin 1, the dehydrating apparatus 14 can be bypassed and the polyol can be permitted to flow via conduits 13, 13' and 15' into tank 16. If the polyol in tank 4 is to be dehydrated it is preferred to maintain it at a temperature of about 120° C. or higher to provide a polyol of the proper viscosity to the dehydrating apparatus 14.

Tank 16 is provided with cooling coil 17 supplied with cooling fluid through conduit 19. Magnetic valve 53 opens and closes in response to a thermocouple in tank 16. Tank 16 is provided with a jacket 54 containing a fluid which can be heated to assist in adjusting the temperature of the polyol in tank 16. Propeller type stirrer 18 extends into tank 16. In order to avoid fluctuations in temperature, an impulse relay with infinitely adjustable time for operation and pause is placed between the magnetic valve and thermometer. The liquid polyol flowing into tank 16 is preferably cooled to about 100° C.

The polyol flows through the bottom of tank 16 into spinning head or pump head 20 and is pumped by metering pump or injection pump 21 driven by motor 22 through a double walled hose 23 to premixing chamber 27. The jacket of hose 23 is connected to a circulating pump 26 through conduits 24 and 25 and is connected to a source of heated fluid and also refrigerated fluid either of which can be used as required. In this way, the temperature of the polyol is closely adjusted to about 100° C.

Tanks 16' and 16" are similar to tank 16 and are used for storage of chain extender, activator mixture or the like. Tank 16' is connected to premixing chamber 27 through spinning or pump head 20' and conduit 28. Metering pump 21' is used to control the volume of liquid delivered from tank 16' to chamber 27. Tank 16" is likewise connected to premixing chamber 27 through spinning or pump head 20" and conduit 29. Metering pump 21" delivers the correct amount of liquid from tank 16" to chamber 27. Flow meters 23', 28' and 29' are used to measure fluid flow through conduits 23, 28 and 29, respectively.

Chamber 27 is provided with stirrer 58. After the components from tanks 16, 16' and 16" have been mixed thoroughly, the resulting substantially uniform reaction mixture flows through overflow pipe 30 and conduit 31 into the main mixing chamber 32.

A solid organic diisocyanate is fed from bin 33 in measured quantities by conveyor-type weigher 34 through conduit 35 to chamber 32. Additional bins or tanks constructed similarly to 33 can be provided for adding metered amounts of other components such as fillers or the like. Tank 36 may be used to store a suitable dye or pigment. When it is desired to produce a colored product, the dye or pigment slurry is pumped through conduit 37 from tank 36 into chamber 32.

Two agitators 55 and 56 rotate in the same direction in chamber 32 to insure intensive and steady mixing of all the components of the reaction mixture.

After complete mixing, the resulting viscous reaction mixture flows from chamber 32 over conveyor belt 40 running from left to right as shown in the drawing at a substantially uniform speed at all times so that the mixture is spread over its surface in a layer about 6 millimeters thick.

A plurality of pipes 41 of substantially rectangular shape are arranged in spaced side-by-side relationship to provide a tablelike surface to support the underside of the conveyor belt 40. The pipes are arranged in such a way that the conveyor belt lying thereon has a troughlike cross section. Pipes 41 are heated adjacent the discharge opening of tank 32. The temperature is maintained at about 100° C. and should not vary more than ±2° C. The reaction is an exothermic reaction so means are provided for compensating for the heat developed as the components of the reaction mixture react to form the polyurethane. Fan 42 blows air over heated wire 43. The heated air is directed over the conveyor adjacent mixer 32 and is exhausted adjacent the other end of the conveyor. By blowing the air over the heated wires and then over conveyor belt 40, that surface of belt 40 adjacent mixer 32 and the polyurethane thereon are heated. Flaps 45 and 46 are provided to exhaust hot air or to permit cool air to enter the blower. Zone 47 of conveyor belt 40 is maintained at a temperature of about 100° C. Zone 48 is cooled by a second fan flowing cool air through cooling pipes 57 supporting the conveyor belt as shown to the right of fan 42 in the drawing. A stream of cool air may also be passed over the polyurethane in space 49. Thermocouple 44 regulates the temperature.

When the solid polyurethane reaches the end of the belt, the resulting slab is conveyed into beater mill 50 where it is ground to form a granulate. The granulate moves upwardly from grinder 50 through spiral conveyor 51 where it is cooled and is discharged therefrom into suitable packing containers.

The apparatus and process provided by the invention are adaptable to the production of thermoplastic polyurethanes from any suitable components of a polyurethane reaction mixture. Examples of formulations which can be prepared and reacted in accordance with the invention are disclosed, for example, in U.S. Pat. Nos. 3,214,411; 3,233,025; 3,312,666 and "Polyurethanes; Chemistry and Technology" by Saunders and Frisch published by Interscience Publishers. The polyol may be, for example, a polyester prepared by esterifying a dicarboxylic acid and a glycol, a poly(alkylene ether)glycol, a polycaprolactone polyester or the like having a molecular weight of at least about 800. The organic diisocyanate is preferably diphenylmethane-4,4'-diisocyanate and is added to mixer 32 from bin 33 as a solid. Any other suitable organic diisocyanate disclosed in the above references may be used but diisocyanates which are liquid at ordinary room temperature, such as, for example, 1,6-hexamethylene diisocyanate are added from a tank 16" or similar tank instead of from bin 33. The chain extender can be any glycol having a molecular weight of less than about 560 such as 1,4-butanediol, hexanediol, ethylene glycol or any of the other diols disclosed in the aforesaid patents and application.

In one embodiment of the process of this invention, a polyester prepared by esterification of adipic acid, ethylene glycol and 1,4-butanediol and having a hydroxyl number of about 56, an acid number of about 1 and a molecular weight of about 2,000 is melted in bin 1 and discharged through trough 3 into tank 4. The polyester is dehydrated in apparatus 14 and flowed into premixer 16. The temperature is adjusted to about 110° C. and then transferred to mixer 27. A chain extender, 1,6-hexanediol, is transferred continuously from tank 16' to mixer 27. Bis(2,6-diisopropyl) phenylcarbodiimide is transferred continuously from tank 16" into mixer 27. The premix from tank 27 and solid particles of diphenylmethane-4,4'-diisocyanate from bin 33 are added simultaneously to mixer 32. The various components are charged to mixer 32 in the ratio of 1,000 parts by weight polyester, 79 parts 1,6-hexanediol, 17 parts carbodiimide and 350 parts diphenylmethane-4,4'-diisocyanate. The resulting mixture is continuously discharged from mixer 32 onto the surface of conveyor belt 40. The resulting thin layer of reaction mixture spreads over the surface of conveyor 40 and the temperature thereof is maintained at about 100° C. in zone 47. Chemical reaction is interrupted after solidification by cooling the product to about room temperature in zone 48. The product is ground in cross beater mill 50 and passes through spiral conveyor 51 where it is cooled. It is later packed in suitable containers.

Although the invention has been described in considerable detail for the purpose of illustration, it is to be understood such detail is solely for that purpose and variations can be made by those skilled in the art without departing from the scope and spirit of the invention.

The embodiments of the invention in which an exclusive property or privilege is claimed are defined as follows:

1. An apparatus for making thermoplastic polyurethanes which comprises a first mixer, means for continuously charging to the first mixer measured amounts of a liquid substantially anhydrous polyol, means comprising a metering pump for transferring a measured amount of at least one other component of a polyurethane reaction mixture to said first mixer, a second mixer, means for transferring liquid from the first to the second mixer, means for charging into said second mixer at least one additional component of a polyurethane reaction mixture, means for uniformly mixing the contents of the second mixer, means comprising a conveyor belt running at a substantially constant speed adjacent a discharge opening of said second mixer and adapted to receive liquid discharged from the mixer as a layer spread over its surface, means for heating the said layer near the said second mixer, means spaced from said second mixer for cooling the layer, and means for collecting the product from the end of the conveyor spaced from said second mixer.

2. The apparatus of claim 1 wherein said conveyor is provided with means for blowing air over a layer of polyurethane thereon.

3. The apparatus of claim 1 wherein said means for charging an additional component to the second mixer comprises a bin adapted for storage of solid diisocyanate and means comprising a conveyor for transferring measured quantities of the diisocyanate as a solid to the second mixer.

4. An apparatus for making thermoplastic polyurethanes which comprises a bin for storing a polyol and having a discharge opening, a trough sloping downwardly from said discharge opening and adapted to receive polyol discharged through said opening, means for heating the trough and for discharging polyol therefrom, a first tank situated to receive polyol discharged from the trough, means for heating the first tank, a dehydrator, means for transferring the polyol from the first tank to the dehydrator, a second tank, means for transferring polyol from the dehydrator to the second tank, means for transferring measured amounts of polyol from the second tank to a first mixer, means for charging measured amounts of another component of polyurethane reaction mixture to the first mixer, means for transferring the resulting mixture to a second mixer, means for charging at least one other component of a polyurethane reaction mixture to the second mixer, means for mixing the contents of the second mixer substantially uniformly, means for discharging the resulting mixture from the second mixer, means comprising a conveyor belt running at a substantially constant speed adjacent a discharge opening of said second mixer and adapted to receive liquid discharged from the mixer as a layer spread over its surface, means for heating the said layer near the said second mixer, means spaced from said second mixer for cooling the layer, and means for collecting the product from the end of the conveyor spaced from said second mixer.

* * * * *